Patented Mar. 21, 1933

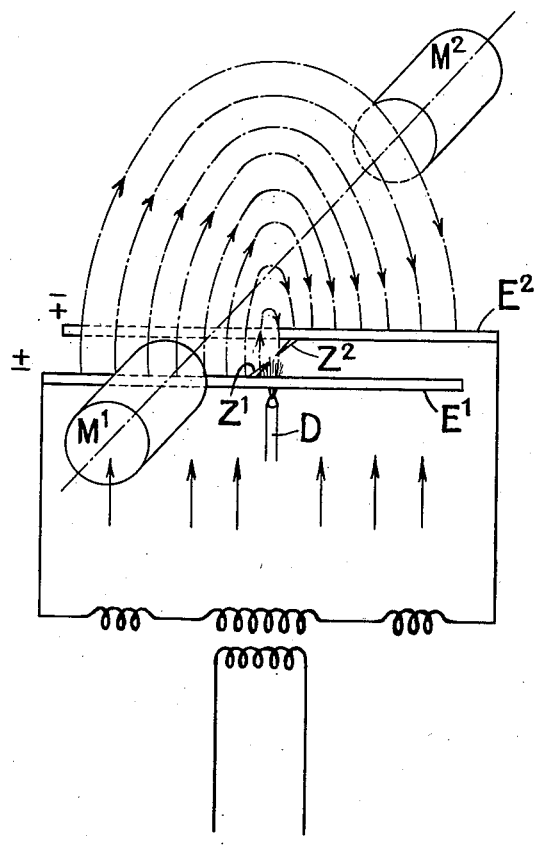

1,902,384

UNITED STATES PATENT OFFICE

EWALD STEINBUCH, OF BASEL, AND MAX ESCHMANN AND HANS SCHWAMMBERGER, OF MONTHEY, SWITZERLAND, ASSIGNORS TO SOCIETY OF CHEMICAL INDUSTRY IN BASLE, OF BASEL, SWITZERLAND

PROCESS FOR PRODUCING CHEMICAL REACTIONS IN GASES AND VAPORS WITH AID OF A HIGH TENSION ELECTRIC ARC

Application filed October 8, 1932, Serial No. 636,960, and in Switzerland October 16, 1931.

This invention relates to a process for producing chemical reactions in gases and vapors by means of a high tension electric arc mechanically (aerodynamically) and magnetically blown. The operation consists in driving the gases in an upward direction between bars constituting electrodes and arranged transversely to the direction of the gases, substantially parallel to each other and approximately at right angles to the lines of force of a magnetic field; the electric arc is struck approximately at the middle points of the electrode bars and the speed of the gas is so selected that the electric arc, affected also by the simultaneous action of the magnetic field of force, is spread out to form a surface directed upwards, the foot of which oscillates on the electrode bars from within outwards.

The accompanying drawing is a diagrammatic illustration of an arrangement suitable for applying the process.

$E_1$ and $E_2$ are horizontal, parallel bars constituting the electrodes, for instance bars of copper or other suitable metal. $M_1$ and $M_2$ are magnet poles between which a magnetic field is produced, the direction of which is essentially parallel to the plane containing the electrodes and essentially perpendicular to the electrodes themselves. $Z_1$ and $Z_2$ are points for striking the arc situated approximately at the middle points of the electrodes. The arrows shown below the electrodes indicate the direction in which the gases are moved from below upwards. The electric arc between the points $Z_1$ and $Z_2$ can be blown upwards either by the current of gas itself or by a separate blowing nozzle D. Under the action of the magnetic field the electric arc is spread out and shifted from the points on to the electrodes from within outwards so that the flaming arc assumes the form of a flat body proceeding from the bars $E_1$ and $E_2$. Since the flame has the tendency to extend itself under the influence of the magnetic field also in the space between the bars $E_1$ and $E_2$, which might lead to short circuiting and other mishaps, the current of gas flowing upwards is given such a speed that it counteracts the influence of the magnetic field at this place, so that the development of the flame occurs in the main only upwards. In the drawing the flame is indicated by the dot and dash lines. When the usual alternating current is used for generating the high tension arc, the flame oscillates in correspondence with the alternating poles from the left side of $E_1$ towards the right side of $E_2$ and then again from the left side of $E_2$ to the right side of $E_1$ and so on.

The bars $E_1$ and $E_2$, which in general may have any suitable cross-section, need not necessarily be straight; for instance they may be inclined to a certain extent from their middle points towards each end, either upwards or downwards. They may be hollow and, if desired, cooled by an internal flow of cold liquid or gas. As to the ignition points, they may be mounted directly on the bars (for example they may be in the form of studs, wedges or the like projecting from the bars), or they may be independent thereof, in which case there may be a device for separating the points and bringing them together again, so that the distance between them may vary. This distance will ordinarily be so adjusted that ignition of the arc occurs with certainty.

The process is applicable for any gas reaction, for instance for the oxidation of atmospheric nitrogen. It is particularly suitable for chemical reactions in gases which contain hydrocarbons (gas or vapor), it may be in admixture with hydrogen, for instance in splitting methane or other hydrocarbons into acetylene and hydrogen or for producing hydrogen-cyanide from nitrogen and hydrocarbons. As is known, the forms of arc hitherto usual in the art, particularly for making oxides of nitrogen, whether moved mechanically (Pauling) or magnetically (Birkeland - Eyde), or stationary (Schönherr), by reason of the different electric behavior of the hydrocarbons and hydrogen, cannot be used without alteration for reactions in which these gases have concern. This difficulty is at once overcome by the process of the present invention.

What we claim is:—

1. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, extending transversely to the direction of the gases and approximately at right angles to the lines of force of the magnetic field, the electric arc being struck approximately at the middle points of the electrodes and the speed of the gas current being so selected that the arc, under the simultaneous effect of the magnetic field, is spread out to assume the form of an upwardly extending body with flat faces the foot of which oscillates on the electrode bars from within outwards.

2. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, and having an inclination to a certain extent from their middle points towards each end, extending transversely to the direction of the gases and approximately at right angles to the lines of force of the magnetic field, the electric arc being struck approximately at the middle points of the electrodes and the speed of the gas current being so selected that the arc, under the simultaneous effect of the magnetic field, is spread out to assume the form of an upwardly extending body with flat faces the foot of which oscillates on the electrode bars from within outwards.

3. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, extending transversely to the direction of the gases and approximately at right angles to the lines of force of the magnetic field, the electric arc being struck approximately at the middle points of the electrodes and the speed of the gas current being so selected that the arc, under the simultaneous effect of the magnetic field, is spread out to assume the form of an upwardly extending body with flat faces the foot of which oscillates on the electrode bars from within outwards.

4. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, and having an inclination to a certain extent from their middle points towards each end, extending transversely to the direction of the gases and approximately at right angles to the lines of force of the magnetic field, the electric arc being struck approximately at the middle points of the electrodes and the speed of the gas current being so selected that the arc, under the simultaneous effect of the magnetic field, is spread out to assume the form of an upwardly extending body with flat faces the foot of which oscillates on the electrode bars from within outwards.

5. A process for the production of chemical reactions in gases and vapors by a high tension electric arc which is blown mechanically (aerodynamically) and magnetically, consisting in driving the gases from below upwards through a space crossed by hollow electrode bars substantially parallel to each other and flown through by a refrigerant, extending transversely to the direction of the gases and approximately at right angles to the lines of force of the magnetic field, the electric arc being struck approximately at the middle points of the electrodes and the speed of the gas current being so selected that the arc, under the simultaneous effect of the magnetic field, is spread out to assume the form of an upwardly extending body with flat faces the foot of which oscillates on the electrode bars from within outwards.

6. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, flown through by a refrigerant, and having an inclination to a certain extent from their middle points towards each end, extending transversely to the direction of the gases and approximately at right angles to the lines of force of the magnetic field, the electric arc being struck approximately at the middle points of the electrodes and the speed of the gas current being so selected that the arc, under the simultaneous effect of the magnetic field, is spread out to assume the form of an upwardly extending body with flat faces the foot of which oscillates on the electrode bars from within outwards.

7. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, extending transversely to the direction of the gases and approximately at right angles to the lines of force of the magnetic field, the electric arc being struck approximately at the middle points of the electrodes which points are movable so that the distance between them may vary, and the speed of the gas current being so selected that the arc, under the simultaneous effect of the magnetic field, is spread out to assume the form of an upwardly extending body with flat faces the foot of which oscillates on the electrode bars from within outwards.

8. A process for the production of chemical reactions in gases and vapors by a high tension electric arc which is blown mechanically (aerodynamically) and magnetically, consisting in driving the gases from below upwards through a spaced crossed by electrode bars of any suitable cross section substantially parallel to each other, and having an inclination to a certain extent from their middle points towards each end, extending transversely to the direction of the gases and approximately at right angles to the lines of force of the magnetic field, the electric arc being struck approximately at the middle points of the electrodes which points are movable so that the distance between them may vary, and the speed of the gas current being so selected that the arc, under the simultaneous effect of the magnetic field, is spread out to assume the form of an upwardly extending body with flat faces the foot of which oscillates on the electrode bars from within outwards.

9. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, and having an inclination to a certain extent from their middle points towards each end, extending transversely to the direction of the gases and approximately at right angles to the lines of force of the magnetic field, the electric arc being struck approximately at the middle points of the electrodes which points are movable so that the distance between them may vary, and the speed of the gas current being so selected that the arc, under the simultaneous effect of the magnetic field, is spread out to assume the form of an upwardly extending body with flat faces the foot of which oscillates on the electrode bars from within outwards.

10. A process for the production of chemical reactions in gases and vapors by a high tension electric arc which is blown mechanically (aerodynamically) and magnetically, consisting in driving the gases from below upwards through a space crossed by hollow electrode bars substantially parallel to each other and flown through by a refrigerant, extending transversely to the direction of the gases and approximately at right angles to the lines of force of the magnetic field, the electric arc being struck approximately at the middle points of the electrodes which points are movable so that the distance between them may vary, and the speed of the gas current being so selected that the arc, under the simultaneous effect of the magnetic field, is spread out to assume the form of an upwardly extending body with flat faces the foot of which oscillates on the electrode bars from within outwards.

11. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, flown through by a refrigerant, and having an inclination to a certain extent from their middle points toward each end, extending transversely to the direction of the gases and approximately at right angles to the lines of force of the magnetic field, the electric arc being struck approximately at the middle points of the electrodes which points are movable so that the distance between them may vary, and the speed of the gas current being so selected that the arc, under the simultaneous effect of the magnetic field, is spread out to assume the form of an upwardly extending body with flat faces the foot of which oscillates on the electrode bars from within outwards.

12. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, extending transversely to the direction of the gases and approximately at right angles to the lines of force of the magnetic field, the electric arc being struck approximately at the middle points of the electrodes and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

13. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, and having an inclination to a certain extent from their middle points towards each end, extending transversely to the direction of the gases and approximately at right angles to the lines of force of the magnetic field, the electric arc being struck approximately at the middle points of the electrodes and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

14. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, and having an inclination to a certain extent from their middle points towards each end, extending transversely to the direction of the gases and approximately at right angles to the lines of force of the magnetic field, the electric arc being struck approximately at the middle points of the electrodes and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

15. A process for the production of chemical reactions in gases and vapors by a high tension electric arc which is blown mechanically (aerodynamically) and magnetically, consisting in driving the gases from below upwards through a space crossed by hollow electrode bars substantially parallel to each other and flown through by a refrigerant, extending transversely to the direction of the gases and approximately at right angles to the lines of force of the magnetic field, the electric arc being struck approximately at the middle points of the electrodes and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

16. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, extending transversely to the direction of the gases and approximately at right angles to the lines of force of the magnetic field, the electric arc being struck approximately at the middle points of the electrodes which points are movable so that the distance between them may vary, and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

17. A process for the production of chemical reactions in gases and vapors by a high tension electric arc which is blown mechanically (aerodynamically) and magnetically, consisting in driving the gases from below upwards through a space crossed by electrode bars of any suitable cross section substantially parallel to each other, and having an inclination to a certain extent from their middle points towards each end, extending transversely to the direction of the gases and approximately at right angles to the lines of force of the magnetic field, the electric arc being struck approximately at the middle points of the electrodes, which points are movable so that the distance between them may vary, and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

18. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, and having an inclination to a certain extent from their middle points towards each end, extending transversely to the direction of the gases and approximately at right angles to the lines of force of the magnetic field, the electric arc being struck approximately at the middle points of the electrodes, which points are movable so that the distance between them may vary, and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

19. A process for the production of chemical reactions in gases and vapors by a high tension electric arc which is blown mechanically (aerodynamically) and magnetically, consisting in driving the gases from below upwards through a space crossed by hollow electrode bars substantially parallel to each other and flown through by a refrigerant, extending transversely to the direction of the gases and approximately at right angles to the lines of force of the magnetic field, the electric arc being struck approximately at the middle points of the electrodes which points are movable so that the distance between them may vary, and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

20. A process for the production of chemical reactions in gases and vapors by a high tension electric arc which is blown mechanically (aerodynamically) and magnetically, consisting in driving the gases from below upwards through a space crossed by hollow electrode bars substantially parallel to each other, flown through by a refrigerant, and having an inclination to a certain extent from their middle points towards each end, extending transversely to the direction of the gases and approximately at right angles to the lines of force of the magnetic field, the electric arc being struck approximately at the middle points of the electrodes which points are movable so that the distance between them may vary, and the speed of the gas current, a part of which is driven by a special blowing nozzle into the electric arc, being so selected that the arc, under the simultaneous effect of the magnetic field, is spread out to assume the form of an upwardly extending body with flat faces the foot of which oscillates on the electrode bars from within outwards.

In witness whereof we have hereunto signed our names this 29th day of September 1932.

EWALD STEINBUCH.
MAX ESCHMANN.
HANS SCHWAMMBERGER.